United States Patent
Jung et al.

(10) Patent No.: US 11,974,183 B2
(45) Date of Patent: *Apr. 30, 2024

(54) SOURCE CELL RELEASE INDICATION FOR DUAL STACK MOBILITY

(71) Applicant: LG Electronics Inc., Seoul (KR)

(72) Inventors: Sunghoon Jung, Seoul (KR); Hongsuk Kim, Seoul (KR); Heejeong Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,383

(22) Filed: Dec. 22, 2022

(65) Prior Publication Data

US 2023/0136751 A1 May 4, 2023

Related U.S. Application Data

(63) Continuation of application No. 16/833,358, filed on Mar. 27, 2020, now Pat. No. 11,576,096.

(60) Provisional application No. 62/825,774, filed on Mar. 28, 2019, provisional application No. 62/825,776, filed on Mar. 28, 2019.

(51) Int. Cl.
*H04W 36/08* (2009.01)
*H04W 8/08* (2009.01)
*H04W 36/32* (2009.01)
*H04W 76/27* (2018.01)
*H04W 76/30* (2018.01)

(52) U.S. Cl.
CPC ............ *H04W 36/08* (2013.01); *H04W 8/08* (2013.01); *H04W 36/32* (2013.01); *H04W 76/27* (2018.02); *H04W 76/30* (2018.02)

(58) Field of Classification Search
CPC .............. H04W 8/08; H04W 36/0069; H04W 36/00692; H04W 36/00695; H04W 36/00698; H04W 36/00837; H04W 36/008375; H04W 36/00838; H04W 36/08; H04W 36/083; H04W 36/085; H04W 36/087; H04W 36/13; H04W 36/18; H04W 36/185; H04W 36/32; H04W 36/322; H04W 36/324; H04W 36/326; H04W 36/328; H04W 76/27; H04W 76/30
See application file for complete search history.

(56) References Cited

U.S. PATENT DOCUMENTS

2020/0022035 A1* 1/2020 Kadiri ............... H04W 36/0072

OTHER PUBLICATIONS

Mediatek Inc. ("Single active protocol stack and dual active protocol stacks to reduce HO interruption", 3GPP TSG-RAN WG2 Meeting #105, R2-1900443, Feb. 25-Mar. 1, 2019) (Year: 2019).*
62696184,Appendix_to_the_specification,Jul. 10, 2018 (Year: 2018).*

(Continued)

*Primary Examiner* — Chi H Pham
*Assistant Examiner* — Ji-Hae Yea
(74) *Attorney, Agent, or Firm* — Fish & Richardson P.C.

(57) ABSTRACT

A method and apparatus for a source cell release indication for dual stack mobility in a wireless communication system is provided. A wireless device, which initiates a mobility from a source node to a target node, keeps communicating with the source node, and receives, from the target node, an indication. Upon receiving the indication, the wireless device stops communicating with the source node.

8 Claims, 16 Drawing Sheets

(56) References Cited

OTHER PUBLICATIONS

62696184, Drawings-only_black_and_white_line_drawings,Jul. 10, 2018 (Year: 2018).*
62696184, Specification,Jul. 10, 2018 (Year: 2018).*
3rd Generation Partnership Project; Technical Specification Group Radio Access Network, "NR; NR and NG-RAN Overall Description; Stage 2 (Release 15)", 3GPP TS 38.300 V15.4.0, Dec. 2018, 12 pages.
Qualcomm Incorporated ("L TE mobility enhancements for MBB handover", 3GPP TSG-RAN WG Meeting #105, R2-1900791, Feb. 25-Mar. 1, 2019) (Year: 2019).

* cited by examiner

US 11,974,183 B2

SOURCE CELL RELEASE INDICATION FOR DUAL STACK MOBILITY

CROSS-REFERENCE TO RELATED APPLICATIONS

This application is a continuation of U.S. application Ser. No. 16/833,358, filed on Mar. 27, 2020, which claims the benefit pursuant to 35 U.S.C. § 119 (e) of U.S. Provisional Application No. 62/825,776, filed on Mar. 28, 2019, and U.S. Provisional Application No. 62/825,774, filed on Mar. 28, 2019, the contents of which are all hereby incorporated by reference herein in their entirety.

TECHNICAL FIELD

The present disclosure relates to a source cell release indication for dual stack mobility.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Network controlled mobility in 5G NR applies to user equipments (UEs) in a connected state (e.g., RRC_CONNECTED) and is categorized into two types of mobility: cell level mobility and beam level mobility. Cell level mobility requires explicit radio resource control (RRC) signaling to be triggered, i.e., handover.

SUMMARY

For enhancement of mobility, e.g., handover, various schemes have been studied and/or discussed. For example, for a user equipment (UE) that has radio capabilities of concurrent transmissions and receptions with at least two cells, maintaining connectivity with both source cell and target cell during mobility may be addressed to increase mobility performance. For this, when and/or how to stop communication with a source cell should be defined.

In an aspect, a method for a wireless device in a wireless communication system is provided. The method includes initiating a mobility from a source node to a target node, keeping communicating with the source node, receiving, from the target node, an indication, and upon receiving the indication, stopping communicating with the source node.

In another aspect, an apparatus for implementing the above method is provided.

DETAILED DESCRIPTION

Figure 1:
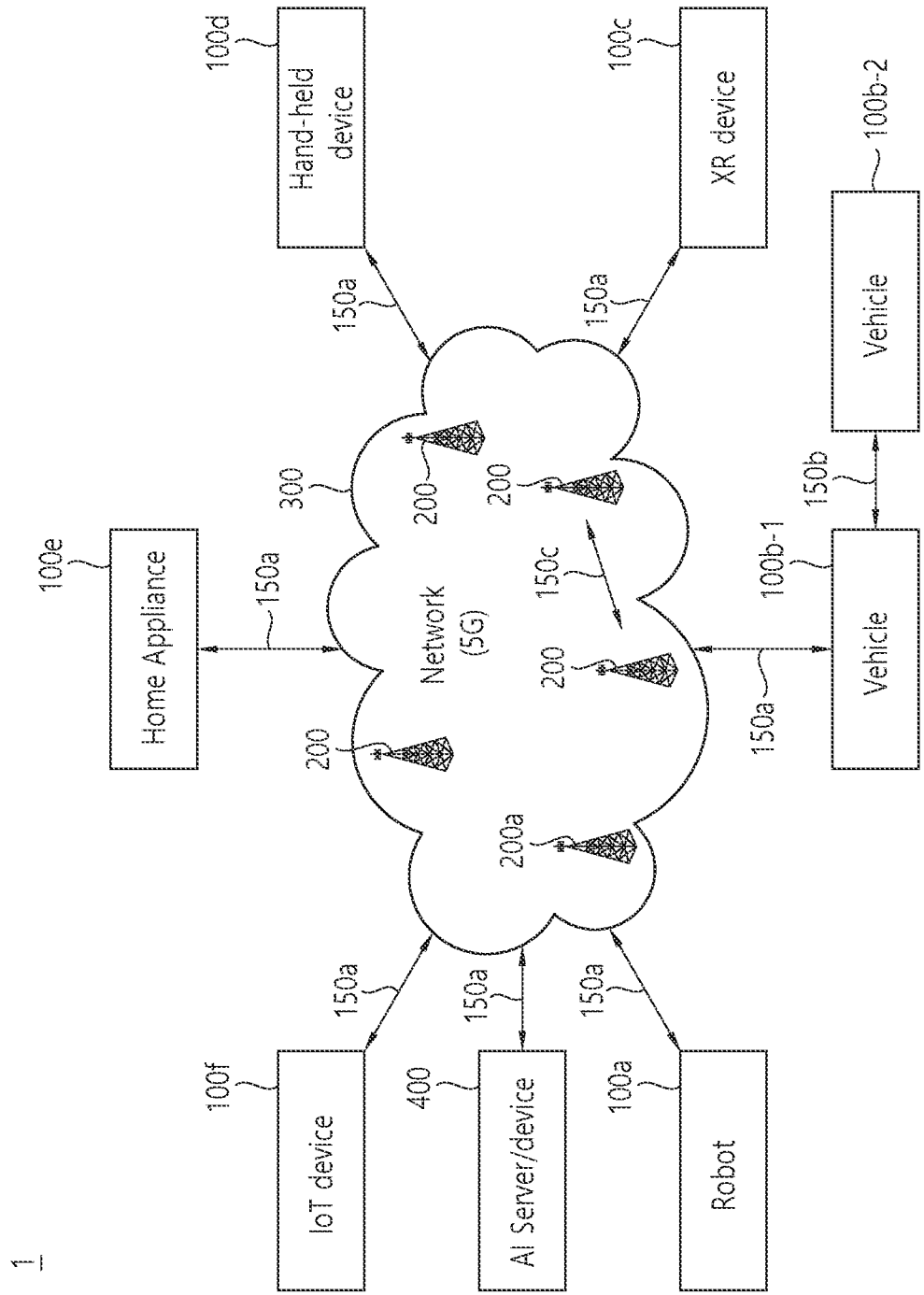
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA)

or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure. "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B. C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (loT) devices will reach 204 hundred million up to the year of 2020. An industrial loT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
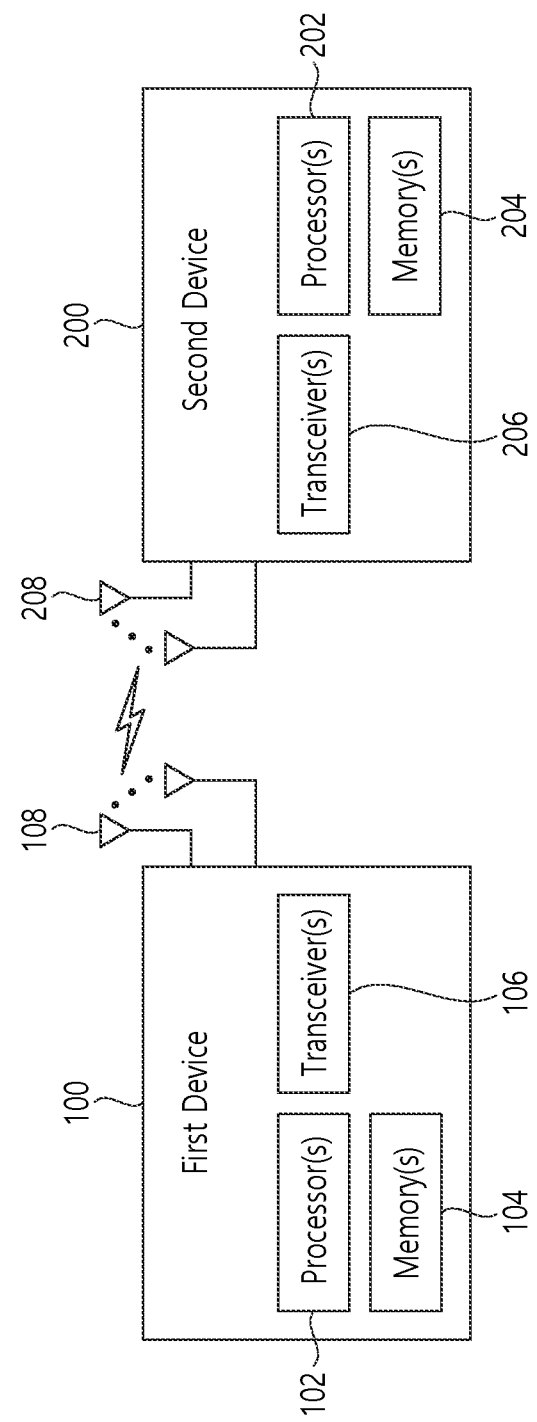
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, (the first wireless device 100 and the second wireless device 200) may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
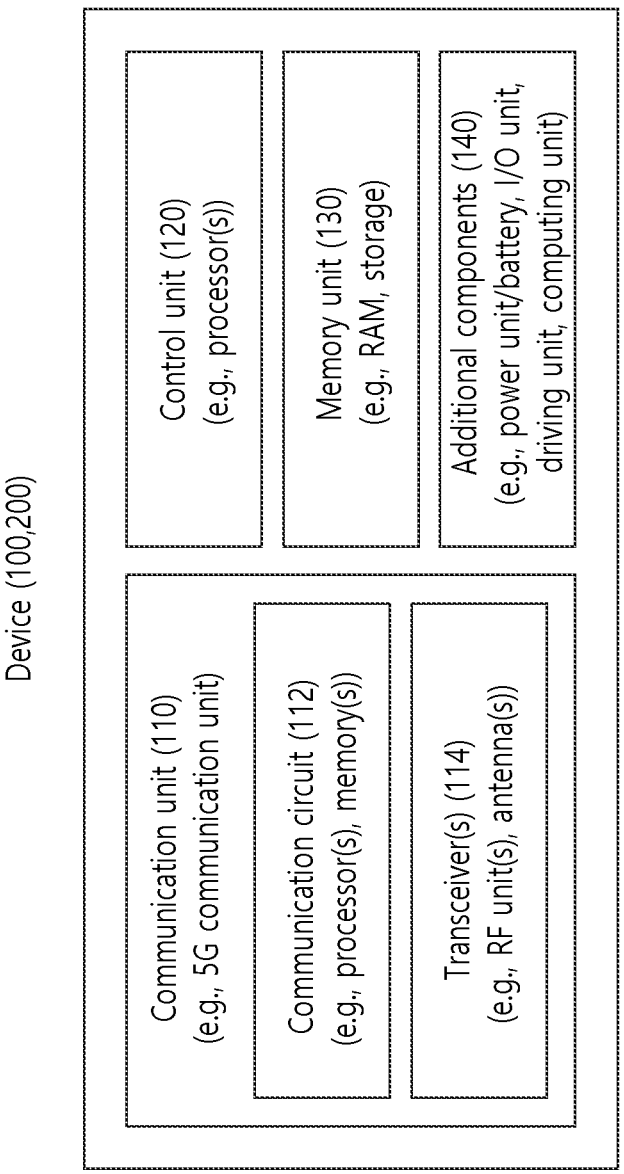
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 10 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
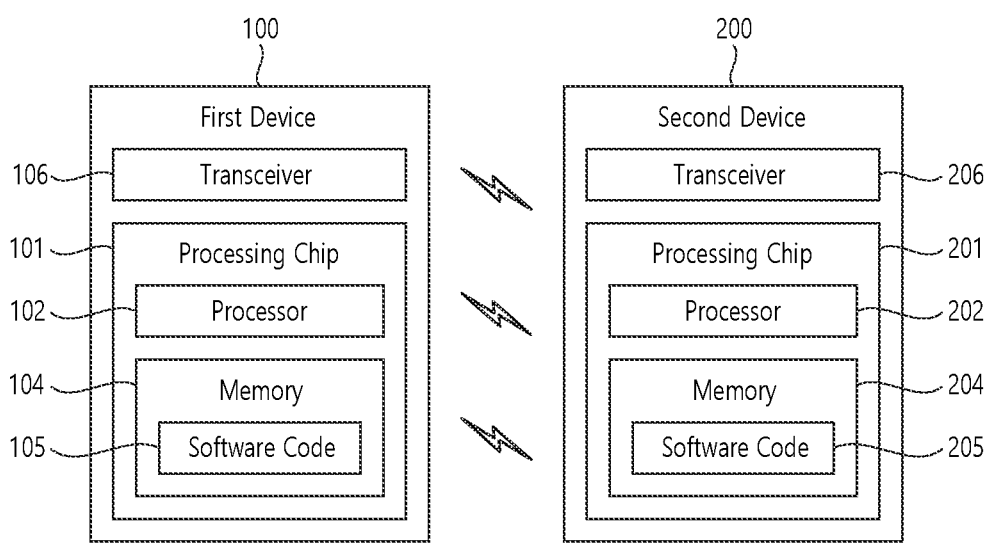
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
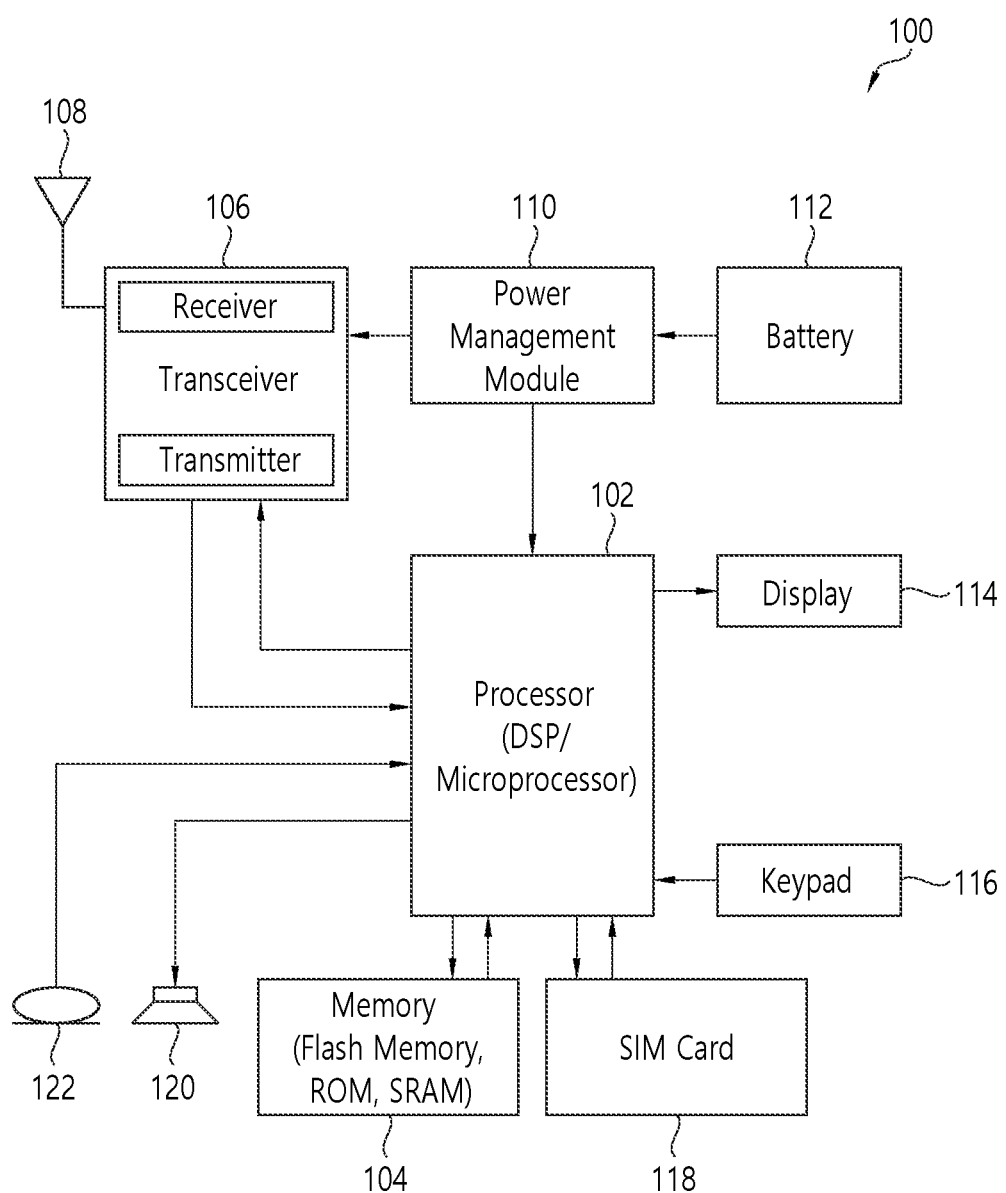
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®. ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
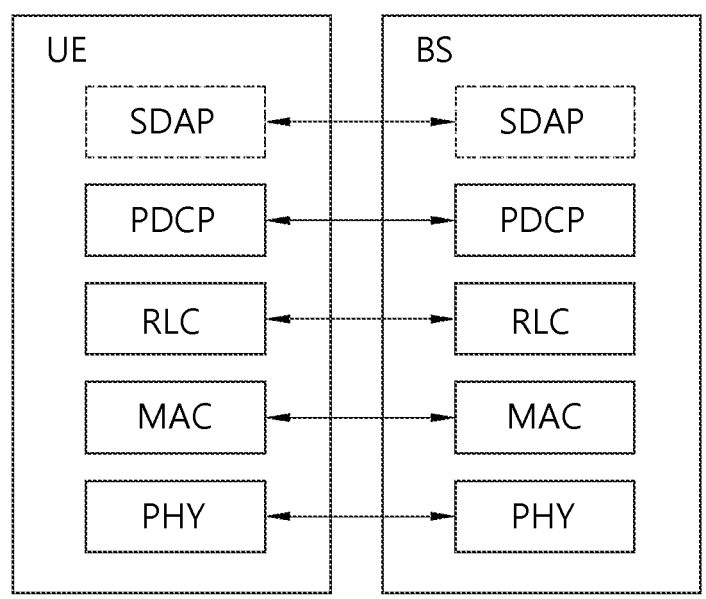
FIGS. 6 and 7 show an example of protocol stacks in a 3GPP based wireless communication system to which implementations of the present disclosure is applied.
Figure 7:
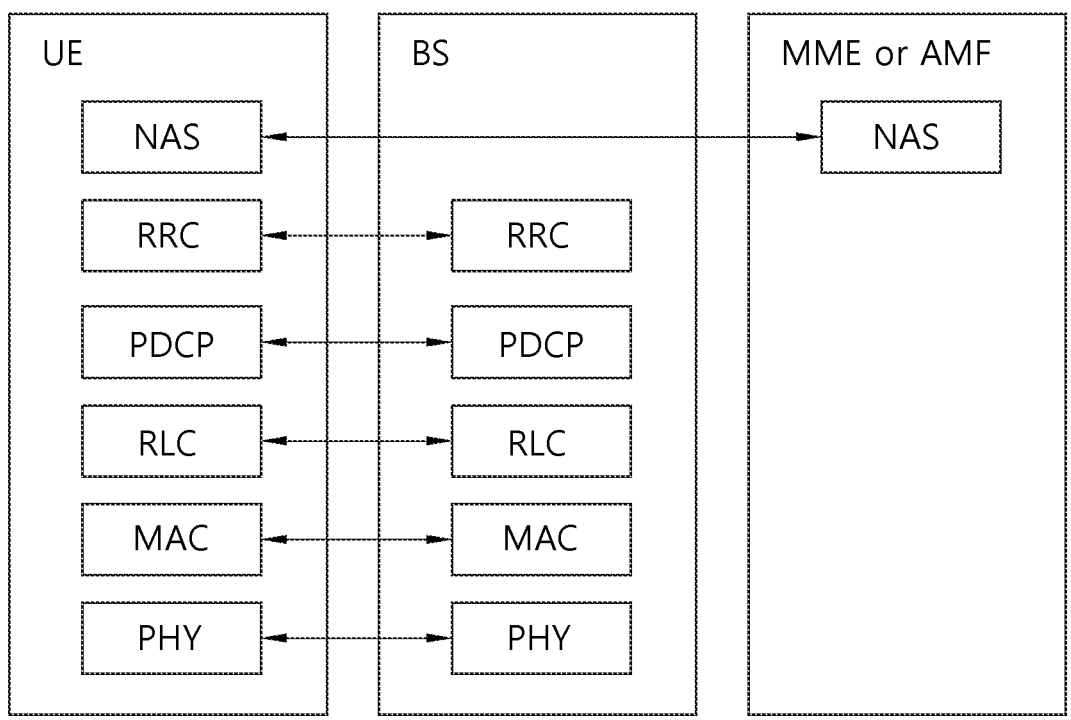

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
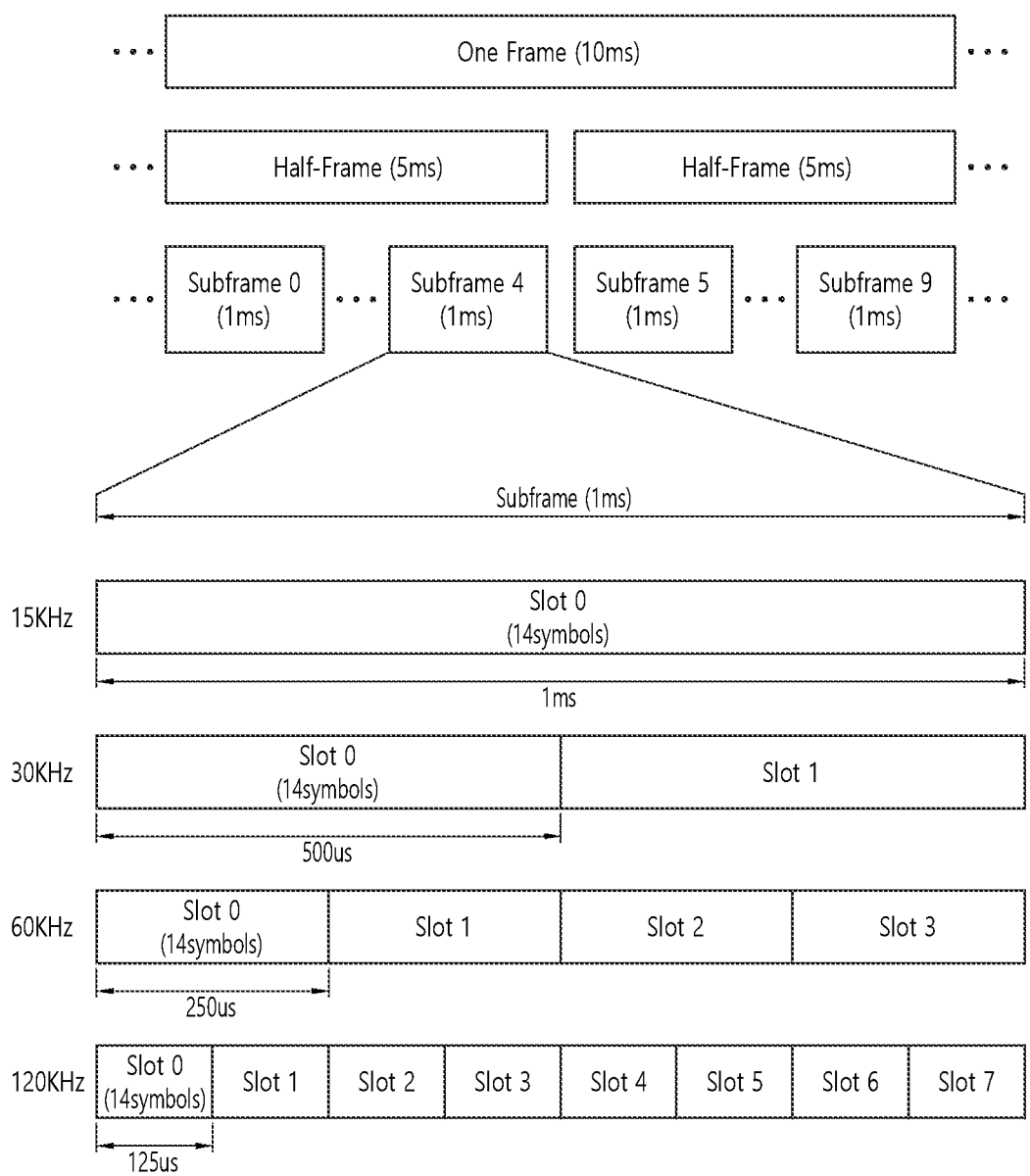
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system. PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
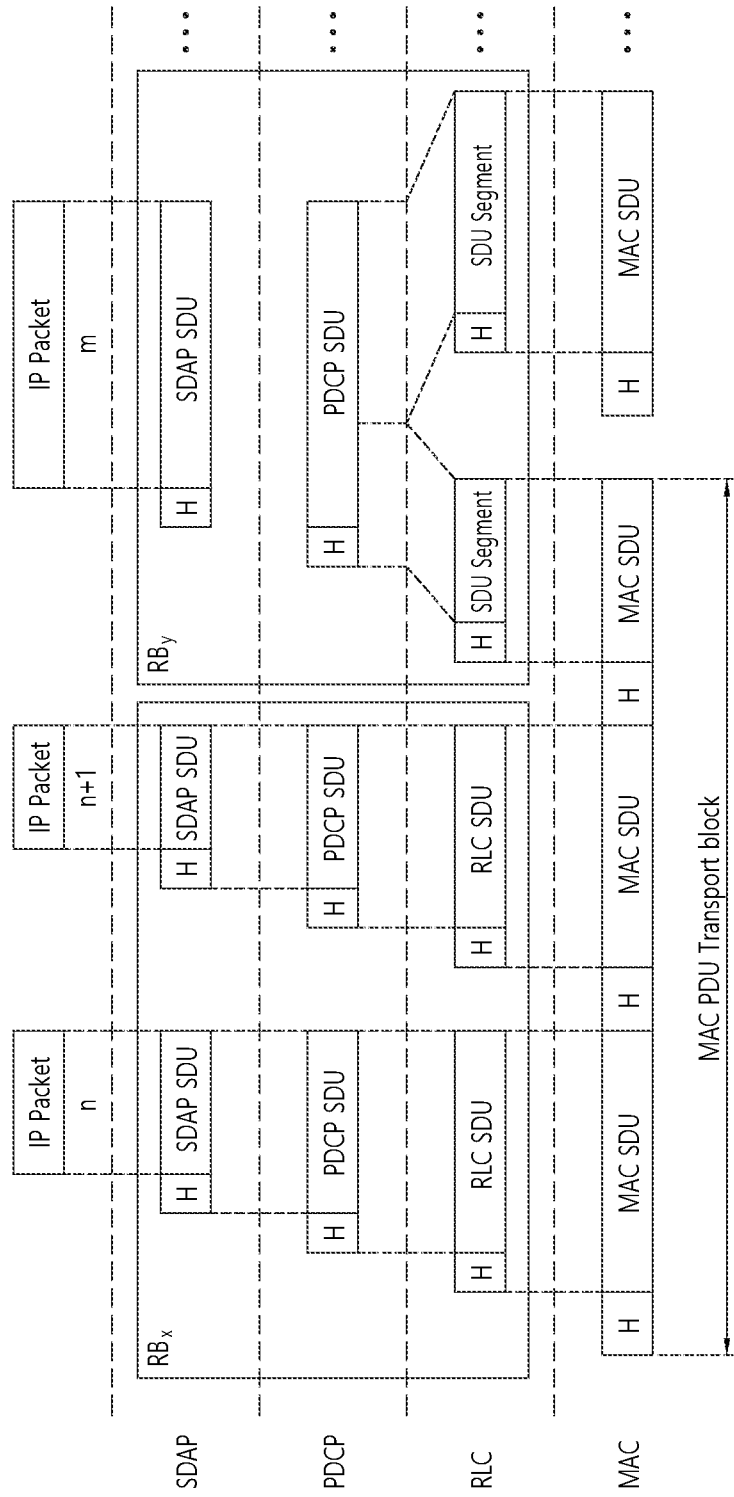
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and random access channel (RACH) are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Handover (HO) in 5G NR is described. Section 9.2.3.2 of 3GPP TS 38.300 V15.4.0 (2018-12) can be referred.

The intra-NR radio access network (RAN) handover performs the preparation and execution phase of the handover procedure performed without involvement of the 5GC, i.e., preparation messages are directly exchanged between the gNBs. The release of the resources at the source gNB during the handover completion phase is triggered by the target gNB.

Figure 10:
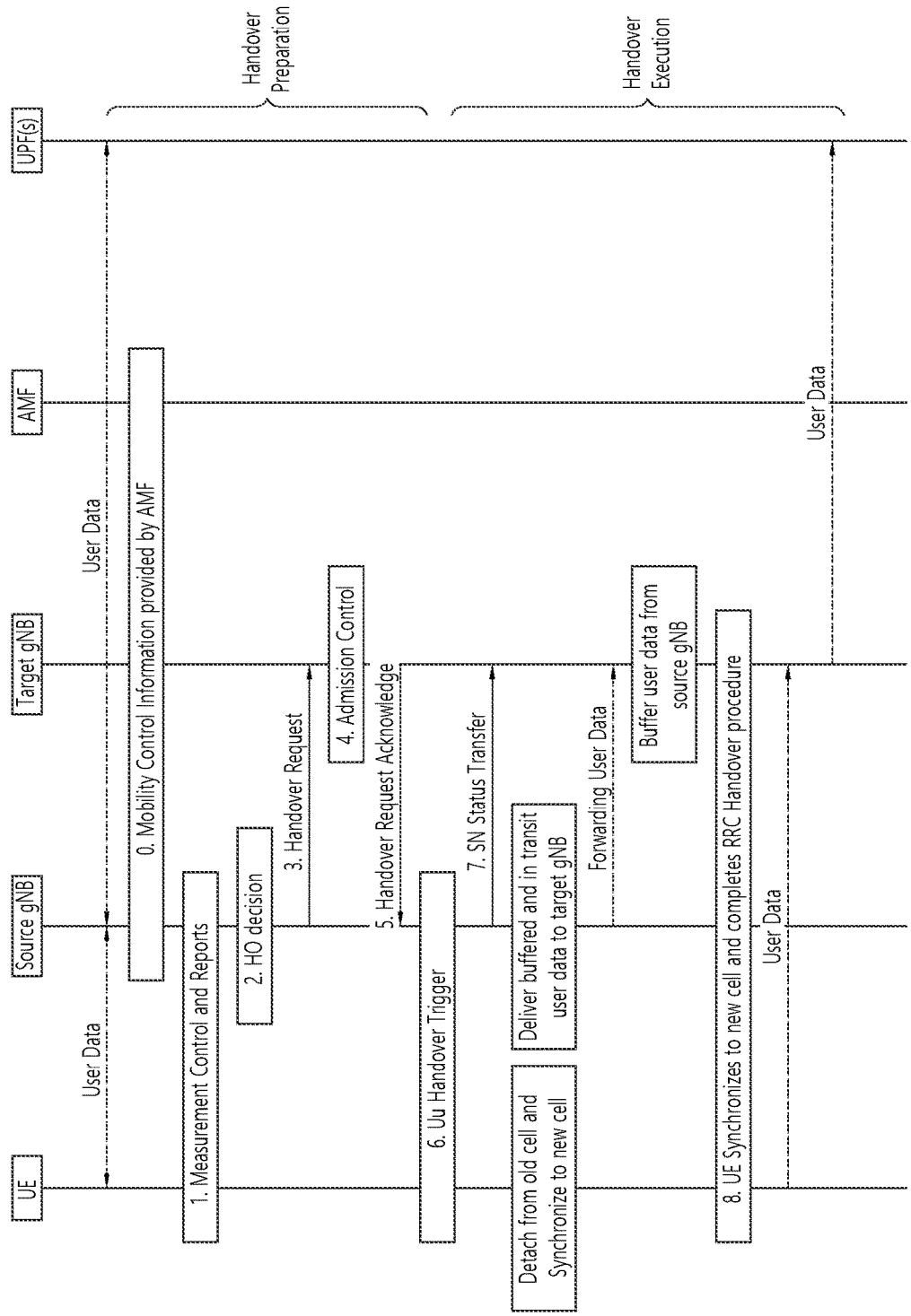
FIG. 10 shows basic intra-AMF/UPF handover scenario, i.e., where neither the access and mobility management function (AMF) nor the user plane function (UPF) changes, to which implementations of the present disclosure is applied.

FIG. 10 shows basic intra-AMF/UPF handover scenario, i.e., where neither the access and mobility management function (AMF) nor the user plane function (UPF) changes, to which implementations of the present disclosure is applied.

Only the preparation and execution phases of the handover procedure are described in FIG. 10. The complete phase of the handover procedure is not described in FIG. 10. The steps described in FIG. 10 can be applied to handover procedure in 5G LTE as well, without loss of generality.

Step 0: The UE context within the source gNB contains information regarding roaming and access restrictions which were provided either at connection establishment or at the last timing advance (TA) update.

Step 1: The source gNB configures the UE measurement procedures and the UE reports according to the measurement configuration.

Step 2: The source gNB decides to handover the UE, based on MeasurementReport and radio resource management (RRM) information.

Step 3: The source gNB issues a Handover Request message to the target gNB passing a transparent RRC container with necessary information to prepare the handover at the target side. The information includes at least the target cell ID. KgNB*, the cell radio network temporary identifier (C-RNTI) of the UE in the source gNB, RRM-configuration including UE inactive time, basic AS-configuration including antenna Info and DL Carrier Frequency, the current quality of service (QoS) flow to DRB mapping applied to the UE, the SIB1 from source gNB, the UE capabilities for different RATs. PDU session related information, and can include the UE reported measurement information including beam-related information if available. The PDU session related information includes the slice information (if supported) and QoS flow level QoS profile(s).

After issuing a Handover Request, the source gNB should not reconfigure the UE, including performing reflective QoS flow to DRB mapping.

Step 4: Admission control may be performed by the target gNB. Slice-aware admission control shall be performed if the slice information is sent to the target gNB. If the PDU sessions are associated with non-supported slices, the target gNB shall reject such PDU sessions.

Step 5: The target gNB prepares the handover with L1/L2 and sends the Handover Request Acknowledge to the source gNB, which includes a transparent container to be sent to the UE as an RRC message to perform the handover.

Step 6: The source gNB triggers the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and synchronization signal (SS)/physical broadcast channel (PBCH) block(s) (SSB(s)), the association between RACH resources and UE-specific channel state information reference signal (CSI-RS) configuration(s), common RACH resources, and system information of the target cell, etc.

Step 7: The source gNB sends the SN STATUS TRANSFER message to the target gNB.

Step 8: The UE synchronizes to the target cell and completes the RRC handover procedure by sending RRCReconfigurationComplete message to target gNB.

The RRM configuration can include both beam measurement information (for layer 3 mobility) associated to SSB(s) and CSI-RS(s) for the reported cell(s) if both types of measurements are available. Also, if CA is configured, the RRM configuration can include the list of best cells on each frequency for which measurement information is available. And the RRM measurement information can also include the beam measurement for the listed cells that belong to the target gNB.

The common RACH configuration for beams in the target cell is only associated to the SSB(s). The network can have dedicated RACH configurations associated to the SSB(s) and/or have dedicated RACH configurations associated to CSI-RS(s) within a cell. The target gNB can only include one of the following RACH configurations in the Handover Command to enable the UE to access the target cell:
  i) Common RACH configuration;
  ii) Common RACH configuration+Dedicated RACH configuration associated with SSB;
  iii) Common RACH configuration+Dedicated RACH configuration associated with CSI-RS.

The dedicated RACH configuration allocates RACH resource(s) together with a quality threshold to use them. When dedicated RACH resources are provided, they are prioritized by the UE and the UE shall not switch to contention-based RACH resources as long as the quality threshold of those dedicated resources is met. The order to access the dedicated RACH resources is up to UE implementation.

The U-plane handling during the intra-NR-access mobility activity for UEs in RRC_CONNECTED takes the following principles into account to avoid data loss during HO:

During HO preparation, U-plane tunnels can be established between the source gNB and the target gNB;

During HO execution, user data can be forwarded from the source gNB to the target gNB. Forwarding should take place in order as long as packets are received at the source gNB from the UPF or the source gNB buffer has not been emptied.

During HO completion: The target gNB sends a path switch request message to the AMF to inform that the UE has gained access and the AMF then triggers path switch related 5GC internal signaling and actual path switch of the source gNB to the target gNB in UPF. The source gNB should continue forwarding data as long as packets are received at the source gNB from the UPF or the source gNB buffer has not been emptied.

(1) For RLC-AM Bearers

For in-sequence delivery and duplication avoidance, PDCP sequence number (SN) is maintained on a per DRB basis and the source gNB informs the target gNB about the next DL PDCP SN to allocate to a packet which does not have a PDCP sequence number yet (either from source gNB or from the UPF).

For security synchronization, hyper frame number (HFN) is also maintained and the source gNB provides to the target one reference HFN for the UL and one for the DL, i.e., HFN and corresponding SN.

In both the UE and the target gNB, a window-based mechanism is used for duplication detection and reordering.

The occurrence of duplicates over the air interface in the target gNB is minimized by means of PDCP SN based reporting at the target gNB by the UE. In uplink, the reporting is optionally configured on a per DRB basis by the gNB and the UE should first start by transmitting those reports when granted resources are in the target gNB. In downlink, the gNB is free to decide when and for which bearers a report is sent and the UE does not wait for the report to resume uplink transmission.

The target gNB re-transmits and prioritizes all downlink data forwarded by the source gNB (i.e., the target gNB should first send all forwarded PDCP SDUs with PDCP SNs, then all forwarded downlink PDCP SDUs without SNs before sending new data from 5GC), excluding PDCP SDUs for which the reception was acknowledged through PDCP SN based reporting by the UE.

Lossless delivery when a QoS flow is mapped to a different DRB at handover, requires the old DRB to be configured in the target cell. For in-order delivery in the DL, the target gNB should first transmit the forwarded PDCP SDUs on the old DRB before transmitting new data from 5G CN on the new DRB. In the UL, the target gNB should not deliver data of the QoS flow from the new DRB to 5GCN before receiving the end marker on the old DRB from the UE.

The UE re-transmits in the target gNB all uplink PDCP SDUs starting from the oldest PDCP SDU that has not been acknowledged at RLC in the source, excluding PDCP SDUs for which the reception was acknowledged through PDCP SN based reporting by the target.

(2) For RLC-UM Bearers:

The PDCP SN and HFN are reset in the target gNB;
No PDCP SDUs are retransmitted in the target gNB;
The target gNB prioritizes all downlink SDAP SDUs forwarded by the source gNB over the data from the core network.

To minimize losses when a QoS flow is mapped to a different DRB at handover, the old DRB needs to be configured in the target cell. For in-order delivery in the DL, the target gNB should first transmit the forwarded PDCP SDUs on the old DRB before transmitting new data from 5G CN on the new DRB. In the UL, the target gNB should not deliver data of the QoS flow from the new DRB to 5GCN before receiving the end marker on the old DRB from the UE.

The UE does not retransmit any PDCP SDU in the target cell for which transmission had been completed in the source cell.

For data forwarding principles for intra-system handover, the source NG-RAN node may suggest downlink data forwarding per QoS flow established for a PDU session and may provide information how it maps QoS flows to DRBs. The target NG-RAN node decides data forwarding per QoS flow established for a PDU Session.

If "lossless handover" is required and the QoS flows to DRB mapping applied at the target NG-RAN node allows applying for data forwarding the same QoS flows to DRB mapping as applied at the source NG-RAN node for a DRB and if all QoS flows mapped to that DRB are accepted for data forwarding, the target NG-RAN node establishes a downlink forwarding tunnel for that DRB.

For a DRB for which preservation of SN status applies, the target NG-RAN node may decide to establish an UL data forwarding tunnel.

The target NG-RAN node may also decide to establish a downlink forwarding tunnel for each PDU session. In this case the target NG-RAN node provides information for which QoS flows data forwarding has been accepted and corresponding UP TNL information for data forwarding tunnels to be established between the source NG-RAN node and the target NG-RAN node.

As long as data forwarding of DL user data packets takes place, the source NG-RAN node shall forward user data in the same forwarding tunnel, i.e., for any QoS flow accepted for data forwarding by the target NG-RAN node and for which a DRB DL forwarding tunnel was established for a DRB to which this QoS flow was mapped at the source NG-RAN node, any fresh packets of this QoS flow shall be forwarded as PDCP SDUs via the mapped DRB DL forwarding tunnel.

for DRBs for which preservation of SN status applies, the source NG-RAN node may forward in order to the target NG-RAN node via the DRB DL forwarding tunnel all downlink PDCP SDUs with their SN corresponding to PDCP PDUs which have not been acknowledged by the UE.

for any QoS flow accepted for data forwarding by the target NG-RAN node for which a DL PDU session forwarding tunnel was established, the source NG-RAN node forwards SDAP SDUs as received on NG-U from the UPF.

As long as data forwarding of UL user data packets takes place for DRBs for which preservation of SN status applies the source NG-RAN node either:

discards the uplink PDCP PDUs received out of sequence if the source NG-RAN node has not accepted the request from the target NG-RAN node for uplink forwarding or if the target NG-RAN node has not requested uplink forwarding for the bearer during the Handover Preparation procedure; or forwards to the target NG-RAN node the uplink PDCP SDUs with their SN corresponding to PDCP PDUs received out of sequence if the source NG-RAN node has accepted the request from the target NG-RAN node for uplink forwarding for the bearer during the Handover Preparation procedure.

For handling of end marker packets, the source NG-RAN node receives one or several GPRS tunneling protocol user plane (GTP-U) end marker packets per PDU session from the UPF and replicates the end marker packets into each data forwarding tunnel when no more user data packets are to be forwarded over that tunnel.

End marker packets sent via a data forwarding tunnel are applicable to all QoS flows forwarded via that tunnel. After end marker packets have been received over a forwarding tunnel, the target NG-RAN node can start taking into account the packets of QoS flows associated with that forwarding tunnel received at the target NG-RAN node from the NG-U PDU session tunnel.

The make-before-break (MBB) and RACH-less handover are considered to reduce handover interruption in LTE. For example, MBB retains the link of source cell during handover procedure. The source cell transmits data to UE continuously until the handover is completed, so the interruption may be reduced. The RACH-less handover contains UL grant for handover complete message in mobility control information via RRC Connection Reconfiguration message. It can help to skip the RACH procedure and reduce the interruption.

Dual active protocol stack (DAPS) based handover is considered in 5G NR. DAPS based handover requires simultaneous connectivity with both source and target cell connections during the handover. This is similar to dual connectivity (DC) feature where the UE has two connections, i.e., master cell group (MCG), secondary cell group (SCG) as well. In case of DC, UE fallback to MCG when the SCG fails and does not trigger the RRC Re-establishment. Similarly, for DAPS based handover, as both the source cell and target cell connections are kept active, the UE can fallback to the other active connection when UE detects RLF on one connection and not trigger RRC Re-establishment. This minimizes the instances where the UE has to trigger RRC Re-establishment and thus improve the mobility robustness.

Figure 11:
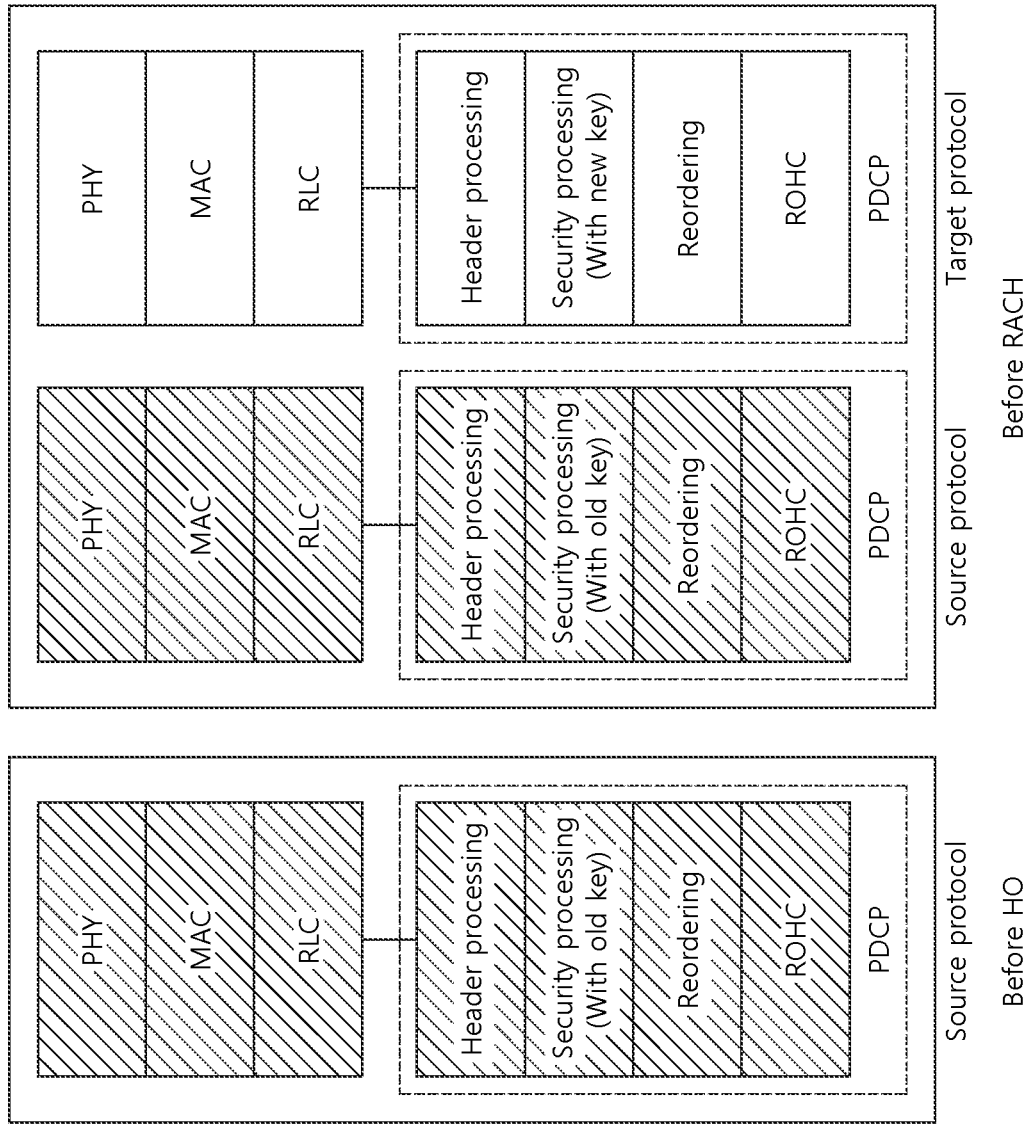
FIG. 11 shows an example of a protocol stack for DAPS based handover to which implementations of the present disclosure is applied.

FIG. 11 shows an example of a protocol stack for DAPS based handover to which implementations of the present disclosure is applied.

(1) Before handover

Only source protocol, and source key is used.

(2) Before RACH procedure (i.e., upon receiving a handover command)

Both source protocol (source key) and target protocol (target key) exist.

But only source protocol, and source key is used.

Figure 12:
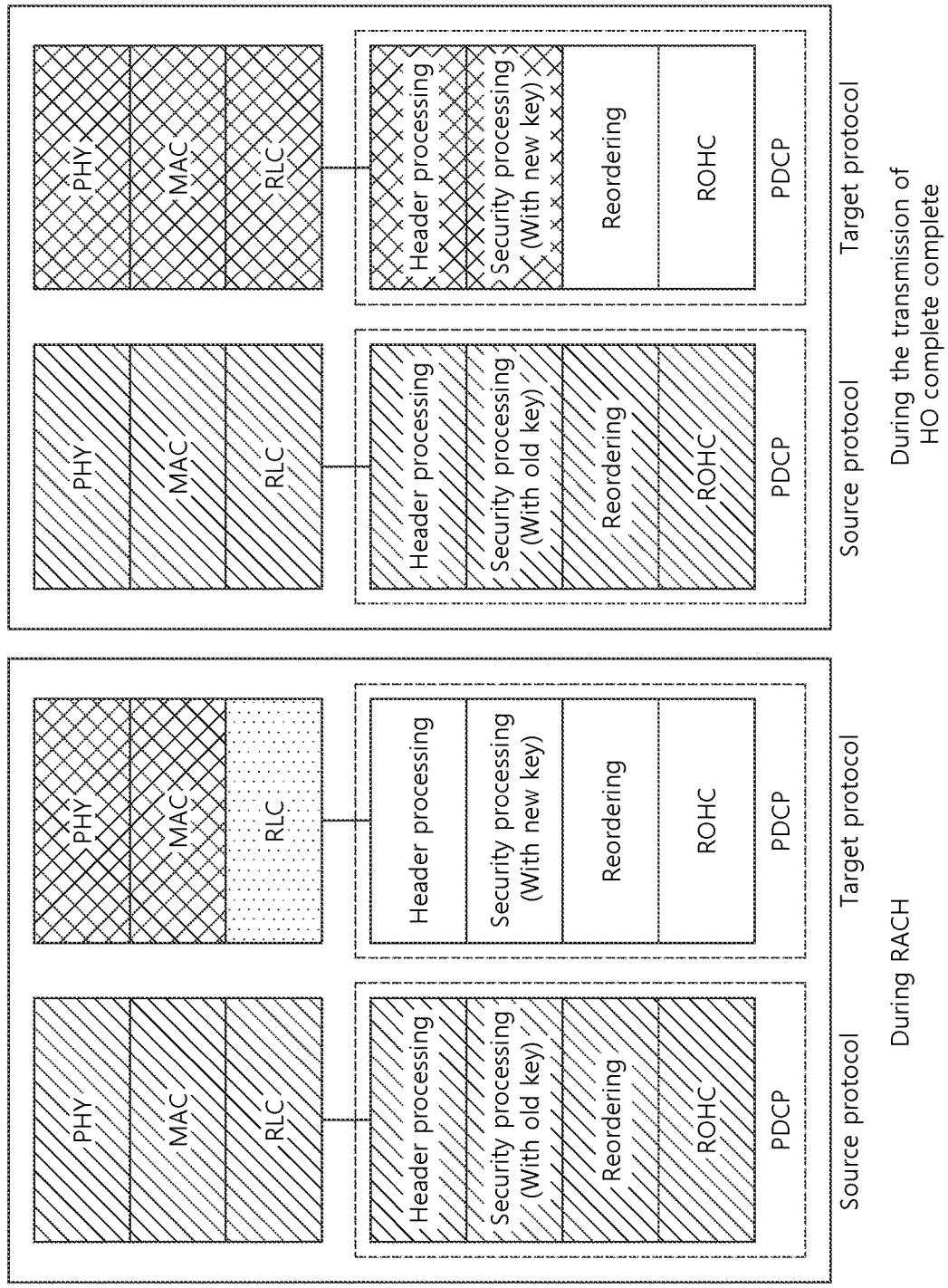
FIG. 12 shows another example of a protocol stack for DAPS based handover to which implementations of the present disclosure is applied.

FIG. 12 shows another example of a protocol stack for DAPS based handover to which implementations of the present disclosure is applied.

(1) During the RACH procedure

Both source protocol (source key) and target protocol (target key) exist.

Source protocol, and source key is used to reception/transmission data from source.

Target PHY and MAC is used to perform the RACH procedure in target.

RLC is active for contention based RACH procedure.

(2) During the transmission of handover complete (i.e., RRCConnectionReconfigurationComplete)

Both source protocol (source key) and target protocol (target key) exist.

Source protocol, and source key is used to reception/transmission data from source.

Target PHY, MAC and SRB PDCP is used to perform the transmission of RRCReconfigurationComplete MCG.

Figure 13:
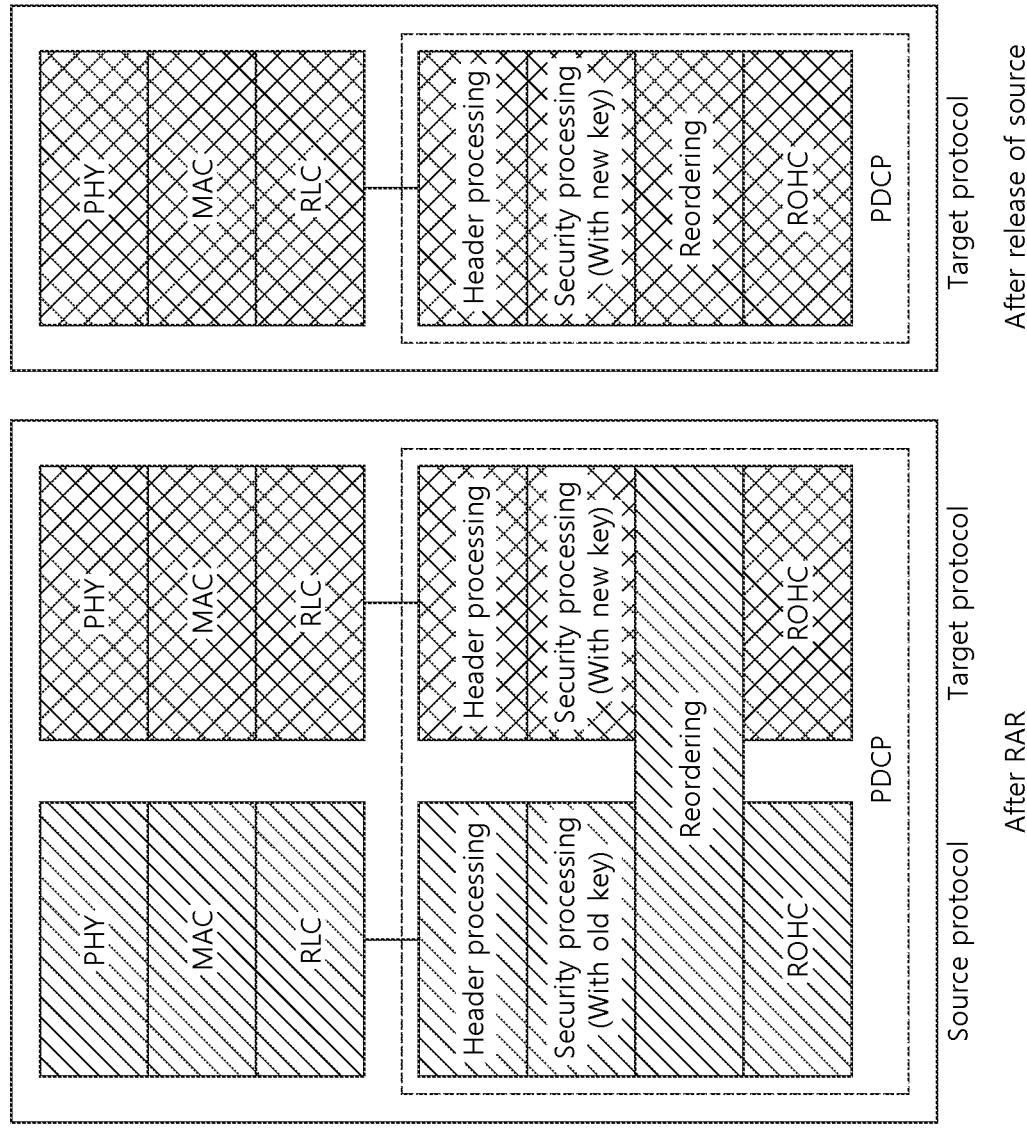
FIG. 13 shows another example of a protocol stack for DAPS based handover to which implementations of the present disclosure is applied.

FIG. 13 shows another example of a protocol stack for DAPS based handover to which implementations of the present disclosure is applied.

(1) After receiving random access response (RAR)

Both source protocol (source key) and target protocol (target key) exist.

Source protocol, and source key is used to reception/transmission data from source.

Target protocol, and target key is used to reception/transmission data from target.

(2) After release of source

Source protocol (source key) has been deleted.

Only target protocol, and target key is used.

In the legacy handover, upon initiating the handover, the UE stops communication (e.g., transmission and/or reception) on source cell. If the UE completes handover, the UE performs communication (e.g., transmission and/or reception) on the target cell. Therefore, extra packet delay may be caused.

If DAPS based handover is configured, a UE being capable of communication with two cells may immediately switch communication link to a target cell after handover completion. In this case, when and/or how to switch communication link from the source cell to the target cell should be addressed. If such problem is clearly not addressed, the following problems may happen.

After handover completion, the target cell may request the source cell to send an SN Status Transfer. The target cell may need to buffer the received UL packets until receiving the SN Status Transfer.

The completion of path switching may be delayed along with the delayed SN transfer during/after mobility. If such delayed path switching happens, the UL packets transmitted to the target cell may need to be forwarded to the source cell, causing extra inter-node packet forwarding delay.

Furthermore, if the UE is allowed to choose either source cell or target cell for transmissions or both during and/or even after mobility through the multi-cell concurrent operation capabilities, it is unclear at all when the UE needs to completely switch its transmissions to the target cell. In the meantime, it is also unclear when the target cell starts to take the responsibility to offer reliable and in-order packet delivery service for the UE. When such ambiguity exists, there may be delay issue. If the switching time of the UE is not properly controlled or defined, there will be extra transmission delays caused by inter-node packet forwarding.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 14:
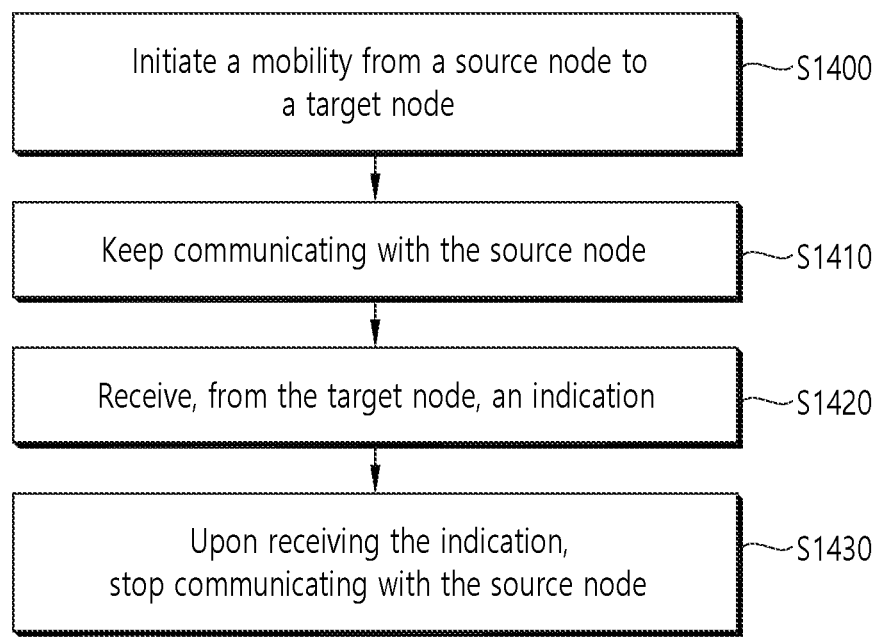
FIG. 14 shows an example of a method for a wireless device to which implementations of the present disclosure is applied.

FIG. 14 shows an example of a method for a wireless device to which implementations of the present disclosure is applied.

In some implementations, the wireless device may be in communication with at least one of a mobile device, a network, and/or autonomous vehicles other than the wireless device.

In step S1400, the wireless device initiates a mobility from a source node to a target node.

In step S1410, the wireless device keeps communicating with the source node.

In step S1420, the wireless device receives, from the target node, an indication.

In some implementations, the indication may inform that a communication with the source node is released. The indication may be received via RRC message.

In step S1430, upon receiving the indication, the wireless device stops communicating with the source node.

In some implementations, a communication link may be switched from the source node to the target node upon receiving the indication.

In some implementations, the wires device may receive a second indication from the source node. The second indication may inform that switching of a communication link from the source node to the target node is delayed. The second indication may inform keeping communicating with the source node after initiating the mobility. The second indication may be received via a mobility command.

In some implementations, communicating with the source node includes at least one of DL communication and/or UL communication.

The indication described above may be "daps-SourceRelease" information element (IE). The daps-SourceRelease IE indicates that the source is released for the DAPS based handover. The daps-SourceRelease IE may be included in the RRCReconfiguration message. The UE shall perform the following actions upon reception of the RRCReconfiguration, or upon execution of the conditional handover:

1> if the RRCReconfiguration includes the daps-SourceRelease:
2> reset source MAC and release the source MAC configuration:
2> for each DRB with a DAPS PDCP entity:
3> release the RLC entity and the associated logical channel for the source;
3> reconfigure the PDCP entity to normal PDCP:
2> for each SRB:
3> release the PDCP entity for the source;
3> release the RLC entity and the associated logical channel for the source:
2> release the physical channel configuration for the source;
2> discard the keys used in source (the KgNB key, the S-$K_{gNB}$ key, the S-$K_{eNB}$ key, the $K_{RRCenc}$ key, the $K_{RRCint}$ key, the $K_{UPint}$ key and the $K_{UPenc}$ key), if any:

The second indication described above may be "dapsConfig" IE. The dapsConfig IE indicates that the bearer is configured as DAPS bearer. The dapsConfig IE may be included in RadioBearerConfig IE, which may be included in the RRCReconfiguration message. The UE shall perform the following actions to execute a reconfiguration with sync.

1> If dapsConfig is configured for any DRB:
2> create a MAC entity for the target with the same configuration as the MAC entity for the source;
2> for each DRB with dapsHO-Config:
3> establish an RLC entity or entities for the target, with the same configurations as for the sourcePCell in accordance with the received rlc-Config;
3> establish the logical channel for the target PCell, with the same configurations as for the source in accordance with the received mac-LogicalChannelConfig;
2> for each DRB without dapsHO-Config:
3> associate the RLC entity, and the associated logical channel, to the target PCell;
2> for each SRB:
3> establish a PDCP entity for the target, with the same configuration as the PDCP entity for the source;
3> configure the PDCP entity with the ciphering algorithms according to securityConfig and apply the key ($K_{RRCenc}$) associated with the master key (KgNB), as indicated in keyToUse, i.e. the ciphering configuration shall be applied to all subsequent messages received and sent by the UE, including the message used to indicate the successful completion of the procedure;
3> configure the PDCP entity with the integrity protection algorithm according to securityConfig and apply the key ($K_{RRCint}$) associated with the master key ($K_{gNB}$), as indicated in keyToUse, i.e. the integrity protection configuration shall be applied to all subsequent messages received and sent by the UE, including the message used to indicate the successful completion of the procedure;
3> establish an RLC entity or entities for the target, with the same configurations as for the source;
3> establish the logical channel for the target PCell, with the same configurations as for the source;
2> suspend SRBs for the source;
2> apply the value of the newUE-Identity as the C-RNTI in the target;
2> configure lower layers for the target in accordance with the received spCellConfigCommon;
2> configure lower layers for the target in accordance with any additional fields, not covered in the previous, if included in the received reconfigurationWithSync.

According to implementations of the present disclosure shown in FIG. 14, when and/or how to stop communication with the source cell during/after the DAPS based handover can be clearly defined. That is, based on the explicit indication from the target cell, the communication with the source cell can be stopped during/after the DAPS based handover. Therefore, service interruption can be minimized during the handover.

Figure 15:
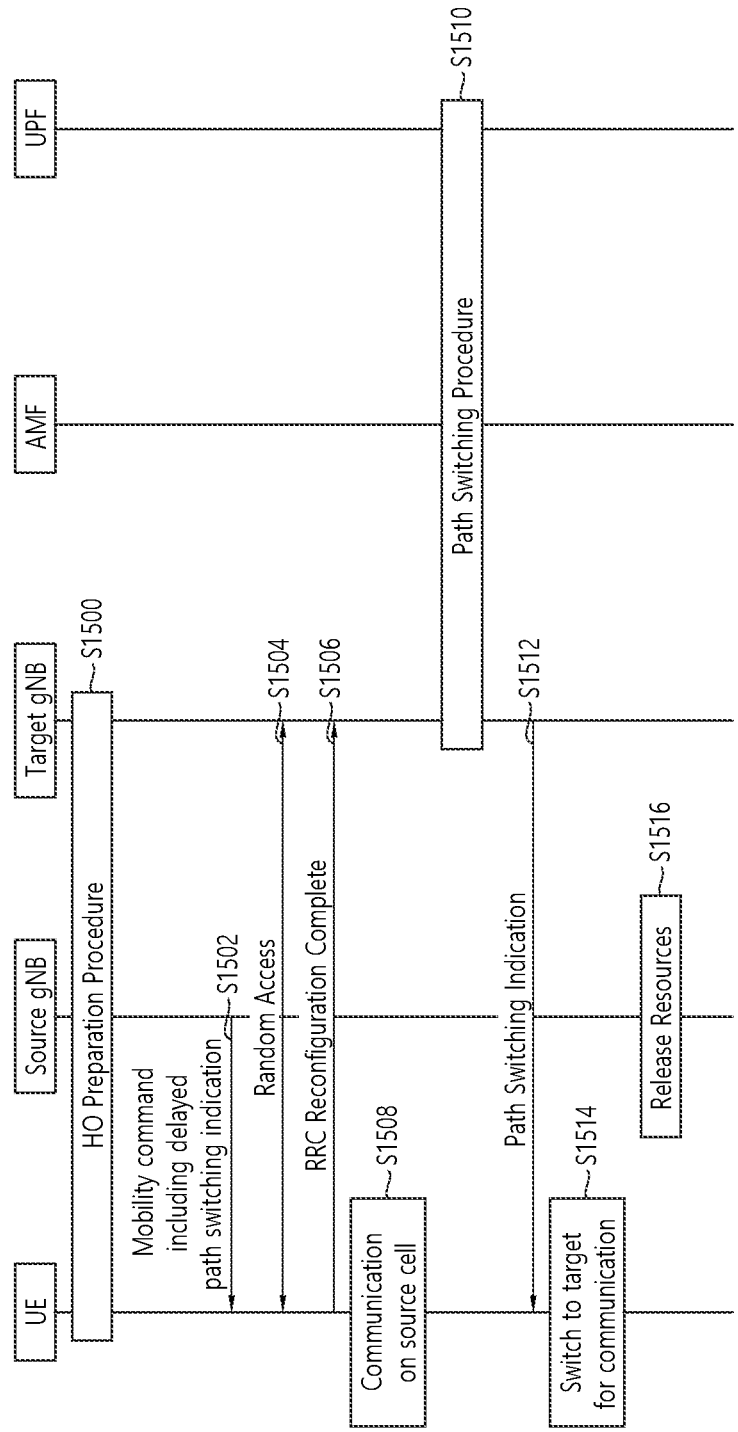
FIG. 15 shows an example of a communication link selection to which implementations of the present disclosure is applied.

FIG. 15 shows an example of a communication link selection to which implementations of the present disclosure is applied.

According to implementations of the present disclosure shown in FIG. 15, the communication link during/after the DAPS based handover may be selected based on indication(s) related to switching of communication link/path/resources. That is, the communication link during/after the DAPS based handover may be selected/switched by explicit manner. Those indications may include a delayed link/path switching indication and/or a link/path switching indication. Those indication(s) may be applied to a specific traffic flow and/or a specific bearer.

According to implementations of the present disclosure shown in FIG. 15, the UL transmission link during/after the DAPS based handover may be selected based on the indication(s) related to switching of communication link/path/resources. Or, the DL reception link during/after the DAPS based handover may be selected based on the indication(s) related to switching of communication link/path/resources.

In step S1500, HO preparation procedure is performed between UE/source cell/target cell. For example, steps 1 to 5 shown in FIG. 10 may be performed.

In step S1502, the UE may receive a delayed link/path switching indication from the source cell.

In some implementations, the UE may be configured by the network with the delayed link/path switching indication. For example, the link/path switching may be effective after mobility is completed based on the delayed link/path switching indication. That is, if the UE is configured with the delayed link/path switching indication, the UE may keep performing communication with the source node (e.g., a source cell) once UE initiates mobility to a target cell.

In some implementations, the delayed link/path switching indication may be received via a reconfiguration message, e.g., mobility command for mobility to at least one target cell.

The UE performs mobility to a target cell. Specifically, in step S1504, the UE may perform random access procedure to get synchronized with the target cell. In step S1506, the UE may transmit a RRC Reconfiguration Complete message to the target cell.

In step S1508, the UE may perform communication with the source cell using the source cell resources. For example, the UE may keep performing UL transmission using the source cell resources. For example, the UE may keep performing DL reception using the source cell resources.

In some implementations, the link/path switching indication may be received via a random access response during the random access procedure in step S1504 mentioned above. If the UE is configured with the delayed link/path switching indication in step S1502, the UE may switch the communication link to the target cell, i.e., the UE may perform communication with the target cell using the target cell resources from now on. That is, only after the UE receives the link/path switching indication, the UE may switch the communication link to the target cell.

In some implementations, else if the link/path switching indication is not received, the UE may perform communication with the source cell using the source cell resources.

In step S1510, a path switching procedure may be performed between the target cell/core network, e.g., AMF/UPF.

In some implementations, upon and/or after a successful completion of the mobility to the target cell, if the UE is not configured with the delayed link/path switching indication in step S1502, the UE may switch the communication link to the target cell, i.e., the UE performs communication with the target cell using the target cell resources upon a successful completion of the mobility to the target cell.

In some implementations, the UE may determine that the mobility is successfully completed if the message indicating the competition of the mobility is successfully delivered to the target cell (e.g., RLC ACK of the message is received).

In step S1512, the UE may receive a link/path switching indication from the target cell.

In step S1514, the UE may switch to the target cell for communication. Equivalently, the UE may release the source link, e.g., by releasing source configurations/resources.

In step S1516, the source cell releases resources.

In some implementations, if the UE is configured with the delayed link/path switching indication in step S1502, the UE may switch the communication link to the target cell, i.e., the UE performs communication with the target cell using the target cell resources from now on. That is, only after the UE receives the link/path switching indication, the UE may switch the communication link to the target cell. The UE may release the source link, e.g., by releasing source configurations/resources.

In some implementations, the link/path switching indication may be received from the target cell. Or, the link/path switching indication may be received from the source cell. The link/path switching indication may be received via a RRC message, MAC PDU/MAC control element (CE), and/or L1 signaling.

In some implementations, else if the link/path switching indication is not received, the UE may perform communication with the source cell using the source cell resources.

The use of source cell resources for communication may be restricted such that even if the UE does not receive the link/path switching indication, the UE may be allowed to use source cell resources only for a maximum time duration. The duration for which the UE is allowed to use source cell resources may start upon initiation of mobility to the target cell. Or, the duration for which the UE is allowed to use source cell resources may start upon completion of mobility to the target cell. This restriction may be applied to the UE configured with the delayed link/path switching indication.

In summary, according to implementations of the present disclosure shown in FIG. 15, the UE performs mobility procedure from a source cell to a target cell. If the UE is not configured with the delayed link/path switching indication, the UE may use source cell resources for communication until mobility initiation and/or mobility completion, depending on implementations, and may switch the communication link to the target cell upon mobility initiation and/or mobility completion, depending on implementations. If the UE is configured with the delayed link/path switching indication, the UE may keep communication with at least one source cell during/after mobility to the target cell. And if the UE receives link/path switching indication, the UE may switch the communication link to the target cell, i.e., the UE performs communication with the target cell using the target cell resources from now on, and releases source configurations/resources. If the UE is configured with the delayed link/path switching indication, the UE may keep using source cell resources for communication until receiving the link/path switching indication from network (e.g., the target cell). The use of source cell resources for communication may be further restricted for a maximum time duration since mobility initiation and/or mobility completion.

According to implementations of the present disclosure shown in FIG. 15, the communication can be performed on the desirable path so that it results in minimal communication delay. As a result, the overall communication delay can be reduced during mobility and hence delay variance can also be reduced.

Figure 16:
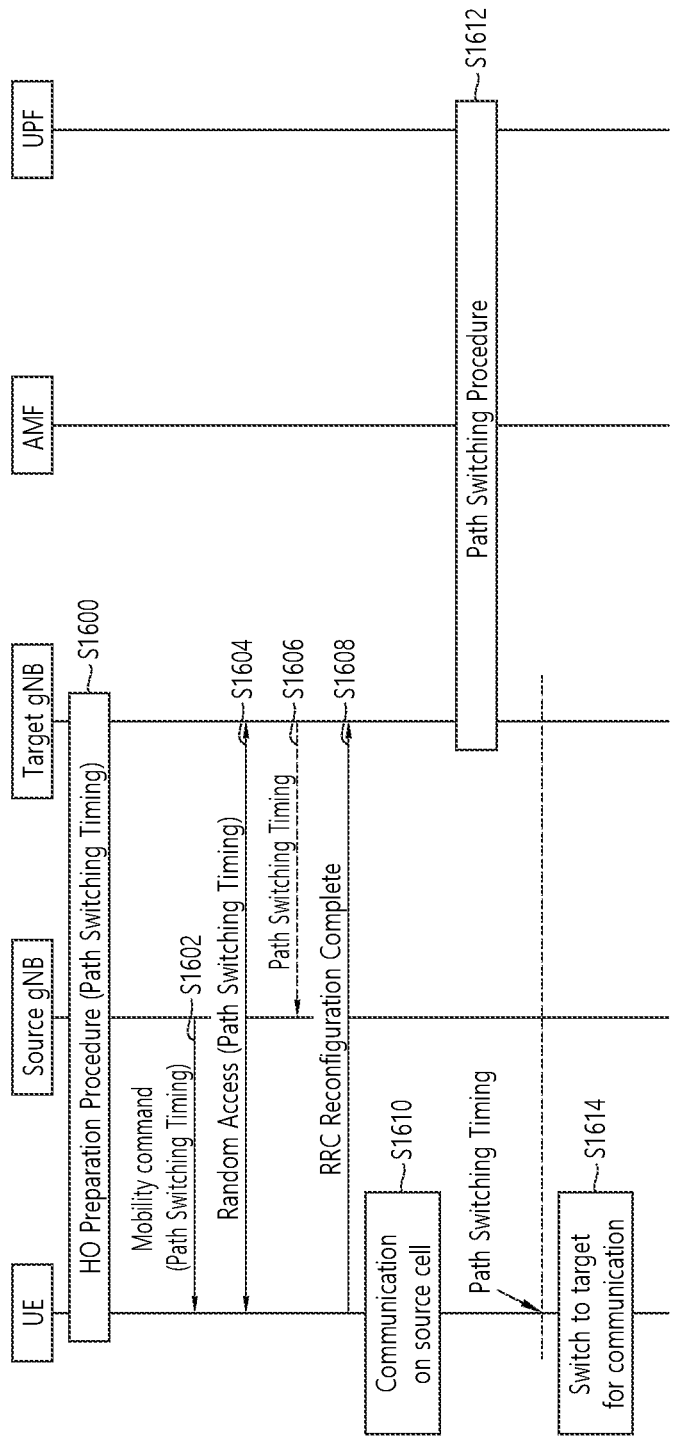
FIG. 16 shows an example of a path switching based on path switching time information to which implementations of the present disclosure is applied.

FIG. 16 shows an example of a path switching based on path switching time information to which implementations of the present disclosure is applied.

According to implementations of the present disclosure shown in FIG. 16, path switching timing information to indicate the timing of path switching from a source cell to a target cell for packet transmissions may be introduced. That is, the communication link during/after the DAPS based handover may be switched by implicit manner.

In some implementations, the path switching timing information may be an absolute timing information based on, e.g., UTC time representation.

In some implementations, the path switching timing information may be timing information taking cell's timing, normally defined by a part of system frame number (SFN) and subframe number. For example, the timing of switching may be represented as a particular cell timing, e.g., SFN subframe number. For example, the timing of switching may be represented as (positive) timing offset relative to a particular cell timing.

According to implementations of the present disclosure shown in FIG. 16, the UL transmission link during/after the DAPS based handover may be selected based on path switching timing information. Or, the DL reception link during/after the DAPS based handover may be selected based on path switching timing information.

In step S1600, HO preparation procedure is performed between UE/source cell/target cell. For example, steps 1 to 5 shown in FIG. 10 may be performed.

In some implementations, for a UE subject to mobility, a target cell may give a source cell the path switching timing information during the handover preparation procedure. The path switching timing information may be indicated to the source cell by the target cell when the target cell sends handover request acknowledge to the source cell. The handover request acknowledge message may include the mobility command to be sent to the UE. Or, the path switching timing information may be indicated to the source cell by the target cell when the target cell identifies the UE accessing the target cell for mobility.

In some implementations, if the current time is prior to the path switching timing according to the path switching timing information, the source cell may perform re-ordering for the received packets that may be coming from source cell and/or target cell for the UE.

In some implementations, if the current time (+offset2) is the same as or has passed the path switching timing according to the path switching timing information, the target cell may perform re-ordering for the received packets that may be coming from source cell and/or target cell for the UE. The source cell may start SN transfer and forwarding of the received packets to the target cell for the UE. The offset2 may be used to further control the path switching timing, e.g., to perform SN transfer and packet forwarding before/after the UE switches UL path.

In step S1602, the UE may receive path switching timing information from the source cell.

In some implementations, the UE may be configured by the network with the path switching timing information. The path switching timing information may be received via a reconfiguration message, e.g., mobility command for mobility to at least one target cell.

The UE performs mobility to a target cell. Specifically, in step S1604, the UE may perform random access procedure to get synchronized with the target cell.

In some implementations, the UE may receive the path switching timing information during the mobility. For example, the path switching timing information may be received via a RAR. For example, the path switching timing information may be received via a MAC PDU of the RAR.

In step S1606, the path switching timing information may be indicated to the source cell by the target cell after the UE successfully completes mobility procedure.

In step S1608, the UE may transmit a RRC Reconfiguration Complete message to the target cell.

In step S1610, the UE may perform communication with the source cell using the source cell resources. For example, the UE may keep performing UL transmission using the source cell resources. For example, the UE may keep performing DL reception using the source cell resources.

In step S1612, a path switching procedure may be performed between the target cell/core network, e.g., AMF/UPF.

In step S1614, the UE may switch to the target cell for communication.

In some implementations, during and/or after a successful completion of the mobility to the target cell, if the UE has not received the path switching timing information, the UE may switch the communication link to the target cell after completion of the mobility, i.e., the UE performs communication with the target cell using the target cell resources after the mobility. If the UE has received the path switching timing information, and if the current time is prior to the path switching timing according to the path switching timing information, the UE may use the source cell resources for communication. If the current time is the same as or has passed the path switching timing according to the path switching timing information, the UE may switch the communication link to the target cell, i.e., the UE performs communication with the target cell using the target cell resources.

In some implementations, the path switching timing information may be received from the target cell. Or, the path switching timing information may be received from the source cell. The path switching timing information may be received via a RRC message, MAC PDU/MAC CE, and/or L1 signaling.

In some implementations, the UE may determine that the mobility is successfully completed if the message indicating the competition of the mobility is successfully delivered to the target cell (e.g., RLC ACK of the message is received).

In summary, according to implementations of the present disclosure shown in FIG. 16, from network perspective, a target cell may give a source cell the path switching timing information. If the current time is prior to the path switching timing, the source cell may perform re-ordering for the received packets that may be coming from source cell and/or target cell for the UE. If the current time is the same as or has passed the path switching timing, the target cell may perform re-ordering for the received packets that may be coming from source cell and/or target cell for the UE, and the source cell may start SN transfer and forwarding of the received packets to the target for the UE.

From UE perspective, the UE may receive path switching time information. If the current time is prior to the path switching timing, the UE may use the source cell resources for communication. If the current time is the same as or has passed the path switching timing, the UE may switch the communication link to the target cell, i.e., the UE performs communication with the target cell using the target cell resources.

According to implementations of the present disclosure shown in FIG. 16, the communication can be performed on the desirable path so that it results in minimal communication delay. As a result, the overall communication delay can be reduced during mobility and hence delay variance can also be reduced.

Furthermore, the path switching related operation can be performed in the synchronized manner among source node, target node as well as UE, so that the delay reduction can be maximally achieved.

The present disclosure can have various advantageous effects.

For example, when and/or how to stop communication with the source cell during/after the DAPS based handover can be clearly defined. That is, based on the explicit indication from the target cell, the communication with the source cell can be stopped during/after the DAPS based handover. Therefore, service interruption can be minimized during the handover.

For example, the communication can be performed on the desirable path so that it results in minimal communication delay.

For example, the overall communication delay can be reduced during mobility.

For example, delay variance can also be reduced.

For example, the path switching related operation can be performed in the synchronized manner among UE/source cell/target cell, so that the delay reduction can be maximally achieved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) in a wireless communication system, the method comprising:
   receiving, from a source node, a radio resource control (RRC) reconfiguration message for a mobility from the source node to a target node, wherein the RRC reconfiguration message comprises a configuration to initiate an uplink (UL) switching after a random access to the target node is successfully completed;
   performing the random access to the target node for the mobility based on receiving the RRC reconfiguration; and
   initiating the UL switching after the random access to the target node is successfully completed based on the configuration,
   wherein a UL transmission is performed to the source node before the UL switching is initiated, and
   wherein the UL switching comprises:
      stopping the UL transmission to the source node upon receiving an explicit indication from the target node; and
      initiating a UL transmission to the target node.

2. The method of claim 1, wherein the explicit indication informs that source resources for the UL transmission to the source node are released.

3. The method of claim 1, wherein the explicit indication is received by the UE via an RRC message.

4. The method of claim 1, wherein the UE is in communication with at least one of a mobile device, a network, or autonomous vehicles other than the UE.

5. A user equipment (UE) configured to operate in a wireless communication system, the UE comprising:
   at least one transceiver;
   at least one processor; and
   at least one computer memory operably connectable to the at least one processor and storing instructions that, based on being executed by the at least one processor, perform operations comprising:
   receiving, from a source node, a radio resource control (RRC) reconfiguration message for a mobility from the source node to a target node, wherein the RRC reconfiguration message comprises a configuration to initiate an uplink (UL) switching after a random access to the target node is successfully completed;
   performing the random access to the target node for the mobility based on receiving the RRC reconfiguration; and
   initiating the UL switching after the random access to the target node is successfully completed based on the configuration,
   wherein a UL transmission is performed to the source node before the UL switching is initiated, and
   wherein the UL switching comprises:
      stopping the UL transmission to the source node upon receiving an explicit indication from the target node; and
      initiating a UL transmission to the target node.

6. The UE of claim 5, wherein the explicit indication informs that source resources for the UL transmission to the source node are released.

7. The UE of claim 5, wherein the explicit indication is received by the UE via an RRC message.

8. An apparatus configured to operate in a wireless communication system, the apparatus comprising:
   at least one processor; and
   at least one computer memory operably connectable to the at least one processor and storing instructions that, based on being executed by the at least one processor, perform operations comprising:
   receiving, from a source node, a radio resource control (RRC) reconfiguration message for a mobility from the source node to a target node, wherein the RRC reconfiguration message comprises a configuration to initiate an uplink (UL) switching after a random access to the target node is successfully completed;
   performing the random access to the target node for the mobility based on receiving the RRC reconfiguration; and
   initiating the UL switching after the random access to the target node is successfully completed based on the configuration,
   wherein a UL transmission is performed to the source node before the UL switching is initiated, and
   wherein the UL switching comprises:
      stopping the UL transmission to the source node upon receiving an explicit indication from the target node; and
      initiating a UL transmission to the target node.

* * * * *